(12) United States Patent
Kishi

(10) Patent No.: US 9,416,756 B2
(45) Date of Patent: Aug. 16, 2016

(54) FLOW CONTROL VALVE AND VAPOR FUEL PROCESSING APPARATUS HAVING THE SAME

(71) Applicant: DENSO CORPORATION, Kariya, Aichi-pref. (JP)

(72) Inventor: Ryoyu Kishi, Obu (JP)

(73) Assignee: DENSO CORPORATION, Kariya (JP)

( * ) Notice: Subject to any disclaimer, the term of this patent is extended or adjusted under 35 U.S.C. 154(b) by 277 days.

(21) Appl. No.: 14/340,945

(22) Filed: Jul. 25, 2014

(65) Prior Publication Data

US 2015/0059711 A1    Mar. 5, 2015

(30) Foreign Application Priority Data

Sep. 3, 2013  (JP) ................................. 2013-181794

(51) Int. Cl.
| | | |
|---|---|---|
| *F02M 25/08* | (2006.01) | |
| *F16K 31/06* | (2006.01) | |
| *F16K 1/52* | (2006.01) | |
| *G05D 7/01* | (2006.01) | |

(52) U.S. Cl.
CPC ............ *F02M 25/0836* (2013.01); *F16K 1/526* (2013.01); *F16K 31/0655* (2013.01); *F16K 31/0693* (2013.01); *G05D 7/0133* (2013.01); *F02M 25/089* (2013.01); *F02M 2025/0845* (2013.01); *Y10T 137/7922* (2015.04)

(58) Field of Classification Search
CPC . F02M 25/08; F02M 25/089; F02M 25/0836; F02M 25/0872; F02M 2025/0845; F16K 15/028; F16K 47/04; F16K 31/0693; Y01T 137/7922
See application file for complete search history.

(56) References Cited

U.S. PATENT DOCUMENTS

| | | | | | |
|---|---|---|---|---|---|
| 2,964,104 | A | * | 12/1960 | Mcaulay ................ | B60K 15/06 137/206 |
| 4,153,025 | A | * | 5/1979 | Thornburgh ....... | F02M 25/0872 123/520 |
| 4,944,276 | A | * | 7/1990 | House ................ | F02M 25/0836 123/520 |
| 5,158,054 | A | * | 10/1992 | Otsuka ............... | F02M 25/0809 123/198 D |
| 9,109,552 | B2 | * | 8/2015 | Williams ............. | F02M 25/089 |

FOREIGN PATENT DOCUMENTS

| | | |
|---|---|---|
| JP | H07-145872 A | 6/1995 |
| JP | H08-226558 A | 9/1996 |
| JP | 2001-165003 A | 6/2001 |
| JP | 2004-156496 A | 6/2004 |
| JP | 2010-281258 A | 12/2010 |
| WO | 2013-050871 A1 | 4/2013 |

OTHER PUBLICATIONS

Office Action issued Sep. 1, 2015 in corresponding JP Application No. 2013-181794.

* cited by examiner

*Primary Examiner* — Hieu T Vo

(57) ABSTRACT

A valve element in a valve chamber is movable between an OFF position and an ON position to switch a flow quantity of fluid between a large flow quantity and a small flow quantity. The valve chamber has a fluid passage including an outer passage defined between an inner periphery of the valve chamber and an outer periphery of the valve element. The valve chamber has a throttle shape to decrease in inner diameter gradually from upstream toward downstream to decrease a minimum passage area of the fluid passage in a non-linear form. The valve chamber increases a differential pressure across the valve element in a linear form relative to a stroke of the valve element when the valve element moves from the OFF position toward the ON position.

4 Claims, 10 Drawing Sheets

FIG. 1A
FIG. 1B
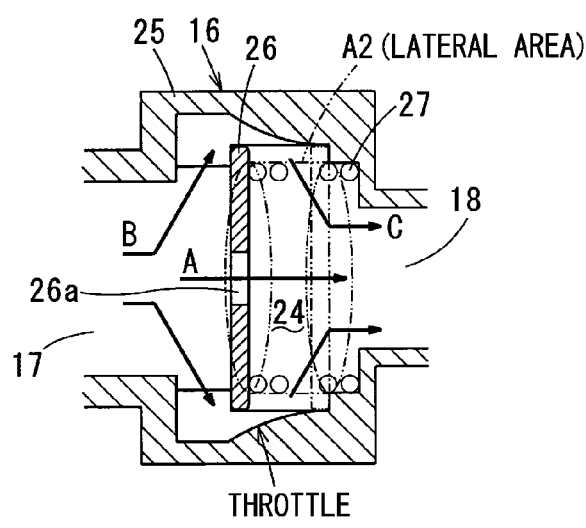
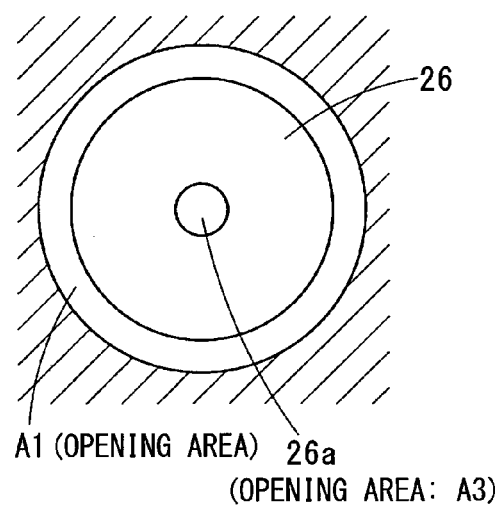

FIG. 10A
PRIOR ART
FIG. 10B
PRIOR ART
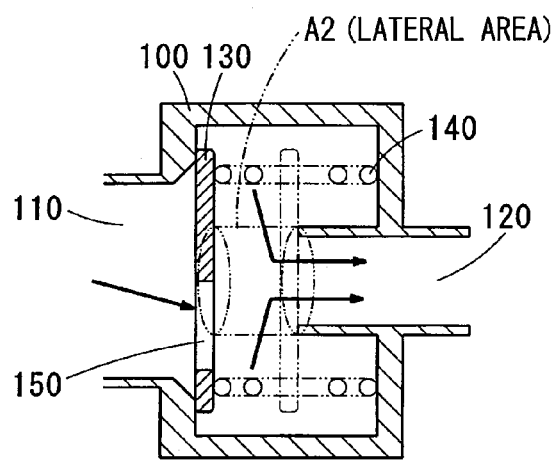
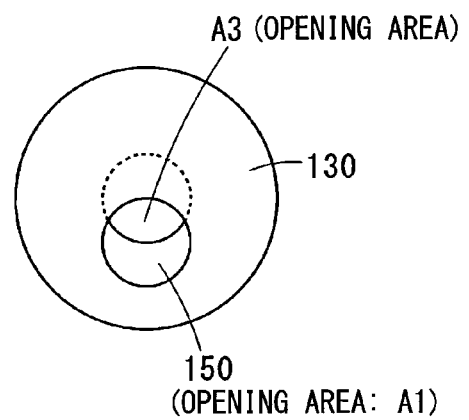

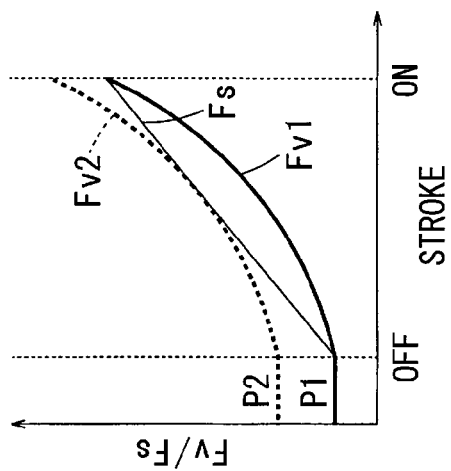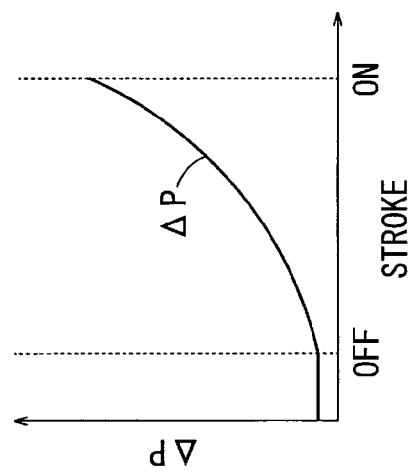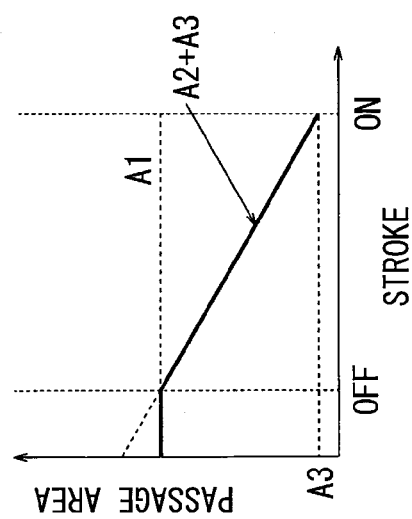

FLOW CONTROL VALVE AND VAPOR FUEL PROCESSING APPARATUS HAVING THE SAME

CROSS REFERENCE TO RELATED APPLICATION

This application is based on reference Japanese Patent Application No. 2013-181794 filed on Sep. 3, 2013, the disclosure of which is incorporated herein by reference.

TECHNICAL FIELD

The present disclosure relates to a flow control valve configured to switch a flow quantity according to a stroke of a valve element. The present disclosure further relates to a vapor fuel processing apparatus including the flow control valve.

BACKGROUND

For example, Patent Document 1 discloses a conventional vapor fuel processing apparatus equipped with a canister, which is configured to communicate with a fuel tank of a vehicle. The vapor fuel processing apparatus includes a tank sealing valve equipped at a path, which is configured to communicate the fuel tank with the canister. The tank sealing valve is configured to seal the fuel tank. The tank sealing valve is controlled at a closed state, excluding a part of a traveling condition of the vehicle or excluding when the vehicle is re-fueled. When re-fueling of the vehicle is detected, the tank sealing valve is maintained in an opened state until the re-fueling of the vehicle is completed. The tank sealing valve is opened, at the time point when the refueling of the vehicle is detected, thereby to enable to flow in-tank gas including fuel vapor into the canister, in advance of opening of the fueling port. The present operation is not to discharge fuel vapor from the tank to the atmosphere. In order not to discharge fuel vapor from the tank to the atmosphere, it is necessary to prohibit opening of the fueling port until in-tank pressure decreases sufficiently. Therefore, waiting time (depressurization waiting time) arises when the vehicle is refueled.

In addition, the in-tank pressure may become remarkably high, while the tank sealing valve is closed. In a case where the tank sealing valve is opened when the in-tank pressure is high, a large quantity of fuel vapor may flow from the fuel tank into the canister. In this case, the quantity of fuel vapor may be greater than a quantity of fuel vapor, by which the canister is capable of absorbing fuel vapor in a unit time. That is, a large quantity of fuel vapor, which exceeds an adsorption capacity of the canister per unit time, may flow from the fuel tank into the canister instantaneously. Therefore, it may be concerned that the canister may cause breakthrough to leak fuel vapor. Consequently, the leaking fuel vapor may flow through an atmospheric port of the canister into the atmosphere. In consideration of this, when the in-tank pressure is high, it may be desirable to reduce the flow quantity of fuel vapor in order to avoid leakage of fuel vapor from the atmospheric port of the canister to the atmosphere. Alternatively, when the in-tank pressure is low and when leakage of fuel vapor to the atmosphere is less possible, it may be desirable to flow a large flow quantity of fuel vapor in order to release pressure immediately.

It is assumable to employ a configuration of a flow control valve disclosed in, for example, Patent Document 2. Nevertheless, it is noted that, variation in inlet pressure may occur when the flow control valve is activated and when the flow control valve is returned.

(Patent Document 1)
Publication of unexamined Japanese patent application No. 2001-165003
(Patent Document 2)
Publication of unexamined Japanese patent application No. 2013-83296

SUMMARY

It is an object of the present disclosure to produce a flow control valve configured to reduce variation in inlet pressure and/or to coincide inlet pressure when a valve element is activated with inlet pressure when the valve element is returned. The present disclosure further relates to produce a vapor fuel processing apparatus including the flow control valve.

As shown in FIG. 10A, the flow control valve disclosed in Patent Document 2 includes a housing 100, a valve element 130, a spring 140, and/or the like. The housing 100 includes an inlet port 110 and an outlet port 120. The valve element 130 is equipped inside the housing 100. The spring 140 biases the valve element 130 toward the inlet port 110. The valve element 130 has a communication hole 150, which communicates the inlet port 110 with the outlet port 120. The communication hole 150 is formed at a position offset from the center of the valve element 130 in the radial direction.

The valve element 130 is movable back and forth between an OFF position and an ON position. The OFF position is located on the side of the inlet port 110, as represented by a solid line in FIG. 10A. The ON position is located on the side of the outlet port 120, as represented by a two-point chain line in FIG. 10A. The flow control valve controls a minimum passage area of a fluid passage, i.e., a flow quantity, according to a stroke of the valve element 130. Specifically, fluid flows into the inlet port 110 to apply inlet pressure onto the valve element 130. Thus, the valve element 130 moves from the OFF position toward the ON position, thereby to change a flow quantity from a small flow quantity to a large flow quantity. As the inlet pressure decreases, the valve element 130 moves from the ON position toward the OFF position, thereby to change the flow quantity from the large flow quantity to the small flow quantity.

When the valve element 130 is at the OFF position, the minimum passage area of the fluid passage is determined by an opening area A1 of the communication hole 150, which opens in the valve element 130. When the valve element 130 is at the ON position, the minimum passage area of the fluid passage is determined by an opening area A3 through which the communication hole 150 communicates with the outlet port 120 (FIG. 10B). When the valve element 130 moves from the OFF position to the ON position, the valve element 130 and an opening end surface of the outlet port 120 form a lateral area A2 therebetween, which is an area of a tubular portion shown by a two-point chain line in FIG. 10A. In the present state, the minimum passage area of the fluid passage is determined by the lateral area A2. As shown in FIG. 11A, the lateral area A2 decreases in a linear form. In FIGS. 11A, 11B, and 11C, the OFF denoted on the horizontal axis represents the OFF position of the valve element 130, and the ON denoted on the horizontal axis represents the ON position of the valve element 130.

In the present state, a front-rear differential pressure $\Delta P$ of the valve element 130 is variable according to the passage area. Specifically, the passage area corresponds to a throttle in the outlet passage. As shown in FIG. 11B, as the valve element 130 moves from the inlet toward the outlet, the front-rear differential pressure ΔP increases in a non-linear form. In the present state, a pressure-receiving force Fv is applied to the valve element 130 to bias the valve element 130 toward the outlet. The pressure-receiving force Fv is a product of the front-rear differential pressure ΔP of the valve element 130 and the pressure-receiving area of the valve element 130. The pressure-receiving force Fv also increases in a non-linear form. To the contrary, as shown by a thin solid line in FIG. 11C, a load of the spring 140 increases in a linear form relative to the stroke of the valve element 130. When the inlet pressure is P2, a relation that Fv2>Fs is satisfied, and the valve element 130 is activated to move from the inlet toward the outlet. When the inlet pressure is P1, a relation that Fv1<Fs is satisfied, and the valve element 130 is returned to move from the outlet toward the inlet. In the present configuration, the inlet pressure P2 does not coincident with the inlet pressure P1, due to the relation between the pressure-receiving force Fv applied onto the valve element 130 and the spring force Fs. It is noted that, in FIG. 11C, Fv1 is the pressure-receiving force applied onto the valve element 130 when the inlet pressure is P1, and Fv2 is the pressure-receiving force applied onto the valve element 130 when the inlet pressure is P2.

As shown in FIG. 12, in the tank sealing valve, a maximum flow quantity is regulated in order to restrict leakage of fuel vapor to the atmosphere. Therefore, a maximum pressure Pmax, which is a pressure at a maximum flow quantity when the flow quantity needs to be changed from a large flow quantity to a small flow quantity, is regulated according to a P-Q characteristic represented in FIG. 12. In addition, a minimum pressure Pmin when the flow quantity is changed from the small flow quantity to the large flow quantity is regulated in consideration of a restriction of a waiting time for de-pressurization when the vehicle is refueled. Therefore, in a case in which the tank sealing valve is opened when the inlet pressure (in-tank pressure) is greater than the maximum pressure Pmax, the flow quantity needs to be switched to a small flow quantity to restrict fuel vapor from blowing through the canister. However, when the tank sealing valve is opened at a pressure Pa between the pressure Pmax and the pressure P2, the valve element 130 does not move from the inlet toward the outlet. Therefore, the flow quantity cannot be changed from the large flow quantity to the small flow quantity. Consequently, the canister may cause breakthrough to leak fuel vapor into the atmosphere.

FIG. 13 shows a case where the inlet pressure P1, when the valve element 130 returns from the outlet toward the inlet, is smaller than the minimum pressure Pmin. In this case, when the tank sealing valve is opened at a pressure Pb, which is higher than P2, the valve element 130 stays at the ON position for a long time. That is, in a time period in which the in-tank pressure (inlet pressure) decreases to P1, which is lower than the minimum pressure Pmin, the valve element 130 does not return to the OFF position. Therefore, a waiting time for de-pressurization when the vehicle is refueled becomes long. That is, the inlet pressure when the valve element 130 is activated may not coincide with the inlet pressure when the valve element 130 is returned. In this case, it may be hard to satisfy both avoidance of breakthrough of the canister and reduction in the waiting time for de-pressurization simultaneously. That is, is may require to compromise either of the avoidance of breakthrough or reduction in the waiting time. Therefore, it may be necessary to coincide the inlet pressure, when the valve element 130 is activated, with the inlet pressure, when the valve element 130 is returned, in order to satisfy avoidance of breakthrough of the canister and reduction in waiting time for de-pressurization, simultaneously.

According to an aspect of the present disclosure, a flow control valve comprises a valve housing defining a valve chamber internally and having an inlet port and an outlet port, the inlet port and the outlet port being opposed to each other in an axial center direction of the valve chamber and opened to the valve chamber. The flow control valve further comprises a valve element equipped in the valve chamber and movable between an OFF position, which is on a side of the inlet port, and an ON position, which is on a side of the outlet port. The flow control valve further comprises a spring configured to bias the valve element toward the OFF position. The valve element is configured, on receiving pressure of fluid flowing into the inlet port, to move from the OFF position to the ON position to switch a flow quantity of fluid, which flows through the valve chamber, from a large flow quantity to a small flow quantity. The valve element is further configured, on decrease in pressure of fluid flowing in the inlet port, to return from the ON position to the OFF position to switch the flow quantity from the small flow quantity to the large flow quantity. The valve chamber has a fluid passage including an outer passage to flow fluid therethrough, the outer passage being defined between an inner periphery of the valve chamber and an outer periphery of the valve element. The valve chamber has a throttle shape to decrease in an inner diameter gradually from an upstream end of the outer passage toward a downstream end of the outer passage to decrease a minimum passage area of the fluid passage in a non-linear form and to increase a front-rear differential pressure of the valve element in a linear form relative to a stroke of the valve element when the valve element moves from the OFF position toward the ON position.

BRIEF DESCRIPTION OF THE DRAWINGS

The above and other objects, features and advantages of the present invention will become more apparent from the following detailed description made with reference to the accompanying drawings. In the drawings:

FIG. 1A is a sectional view showing a configuration of a flow control valve; and FIG. 1B is a plan view showing passage areas of the flow control valve;

FIG. 10A is a sectional view showing a configuration of a flow control valve according to a prior art; and FIG. 10B is a plan view showing passage areas of the flow control valve according to the prior art;

FIG. 11A is a graph showing a minimum passage area relative to a stroke of the flow control valve according to the prior art; FIG. 11B is a graph showing a relation between the stroke of the flow control valve and a front-rear differential pressure of the flow control valve according to the prior art; and FIG. 11C is a graph showing a relation between the stroke of the flow control valve and a pressure-receiving force and a relation between the stroke of the flow control valve and a spring force according to the prior art;

DETAILED DESCRIPTION

As follows, embodiments of the present disclosure will be described.

First Embodiment

Figure 9:
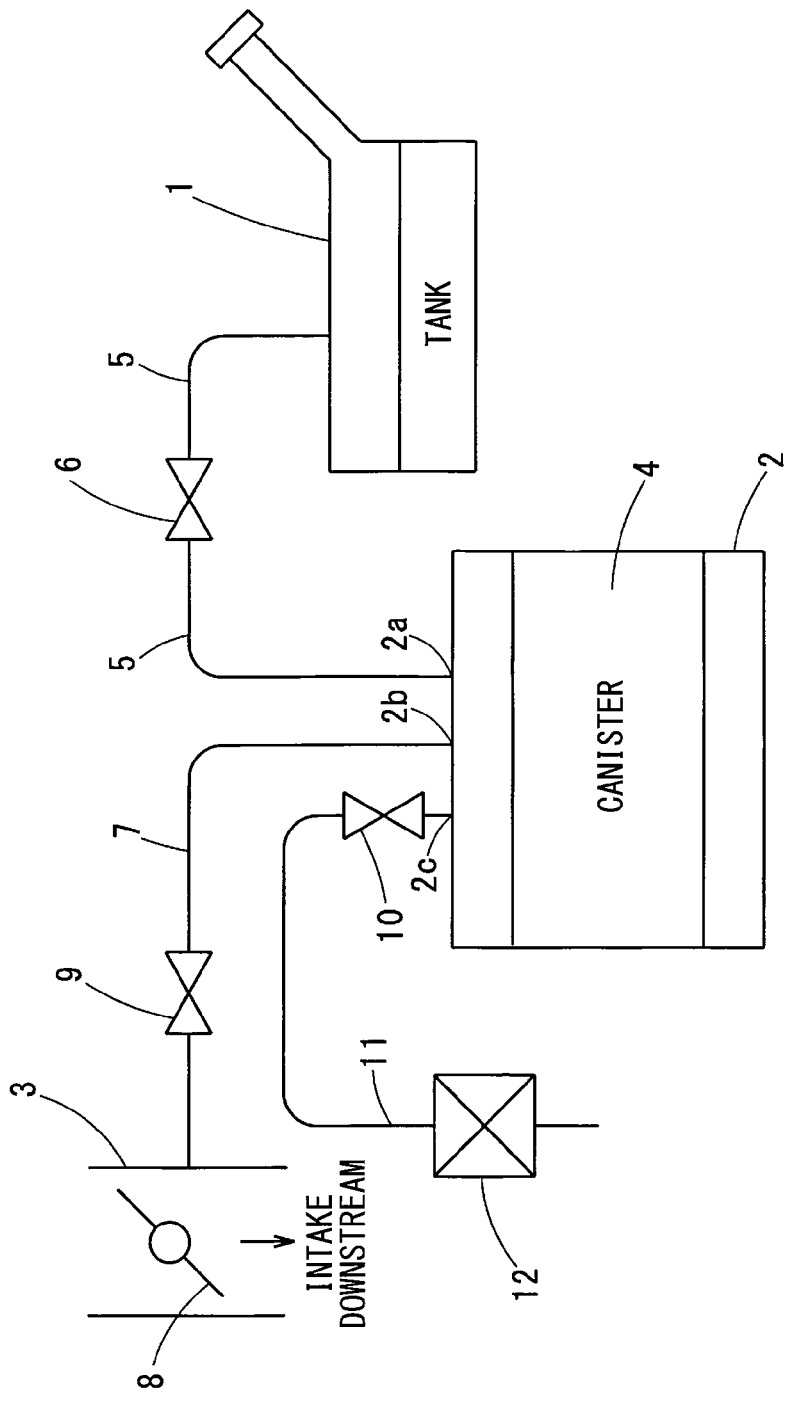
FIG. 9 is a diagram showing a vapor fuel processing apparatus.
Figure 12:
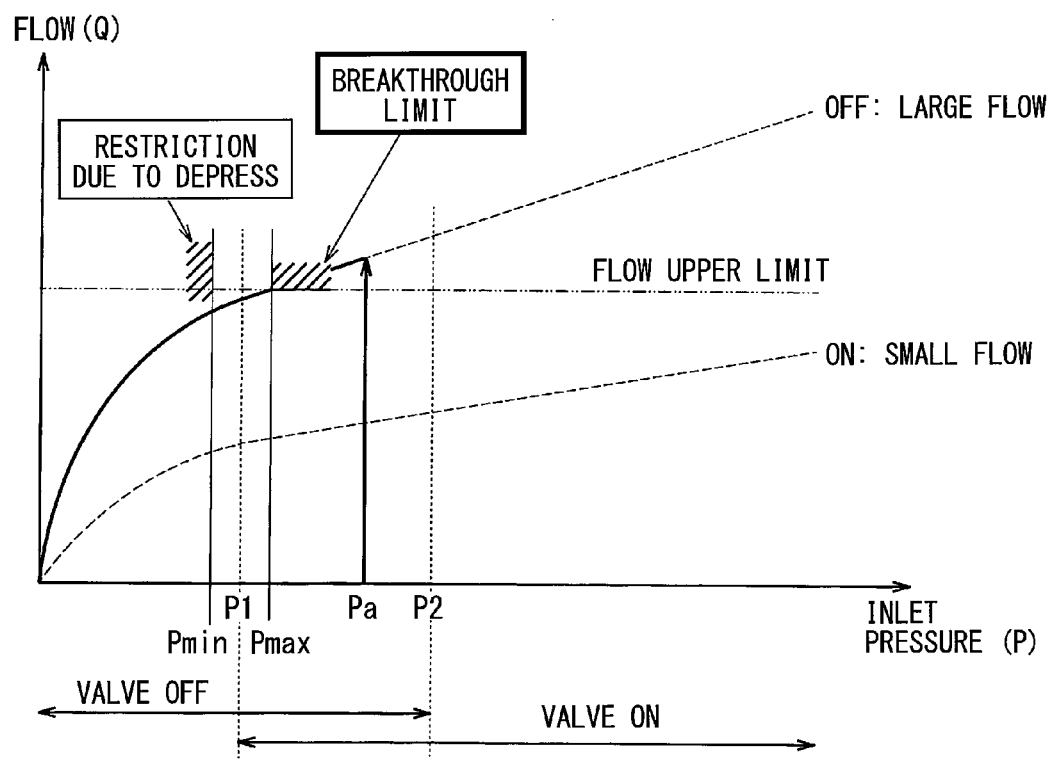
FIG. 12 is a graph showing a P-Q characteristic when the flow control vale according to the prior art is at an OFF position and a P-Q characteristic when the flow control vale according to the prior art is at an ON position, for explanatory of a breakthrough limit of a canister according to the prior art.
Figure 13:
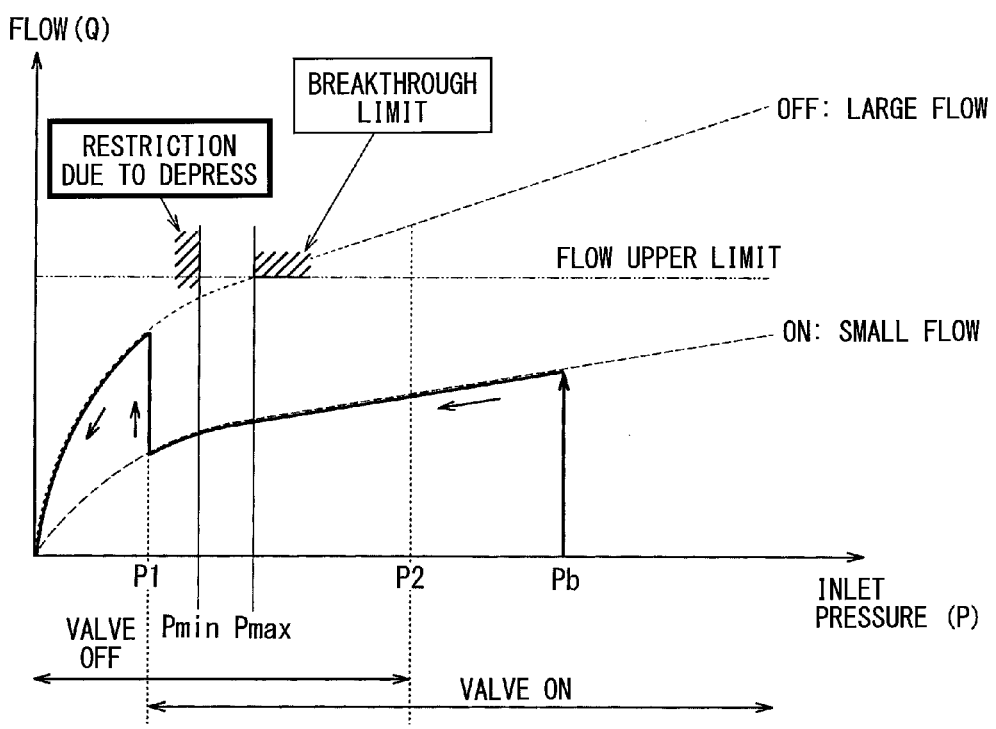
FIG. 13 is a graph showing a P-Q characteristic when the flow control vale according to the prior art is at the OFF position and a P-Q characteristic when the flow control vale according to the prior art is at the ON position, for explanatory of a restriction due to waiting time for de-pressurization according to the prior art.

In a first embodiment, a flow control valve according to the present disclosure is employed in a vapor fuel processing apparatus for a vehicle. As shown in FIG. 9, the vapor fuel processing apparatus includes a canister 2 to temporarily adsorb and hold fuel vapor, which is evaporated inside a fuel tank 1. Fuel vapor is once adsorbed in the canister 2. The absorbed fuel vapor is drawn from the canister 2 into an intake passage 3, when an internal combustion engine is in operation, and further drawn into a combustion chamber of the internal combustion engine. Thus, the drawn fuel vapor is burned in the combustion chamber. The canister 2 includes a canister case having a tank port 2a, a purge port 2b, an atmospheric port 2c, and/or the like. The canister case accommodates an adsorbent 4, such as activated carbon, to adsorb fuel vapor.

The tank port 2a is connected to the fuel tank 1 through a vapor passage 5. The vapor passage 5 is equipped with a tank sealing valve 6, which includes the flow control valve according to the present disclosure. The purge port 2b is connected to the intake passage 3 through a purge passage 7. The intake passage 3 is located on the downstream side of a throttle valve 8. The purge passage 7 is equipped with a purge control valve 9. The purge control valve 9 controls a flow quantity of fuel vapor, which is drawn from the canister 2 into the intake passage 3. The atmospheric port 2c is equipped with a canister control valve 10. The canister control valve 10 opens and closes the atmospheric port 2c. The canister control valve 10 has an atmospheric opening port connected with an atmospheric opening passage 11. The atmospheric opening passage 11 is equipped with an air filter 12 to filter air (fresh air), which flows into the canister 2 when the canister control valve 10 opens.

Figure 4:
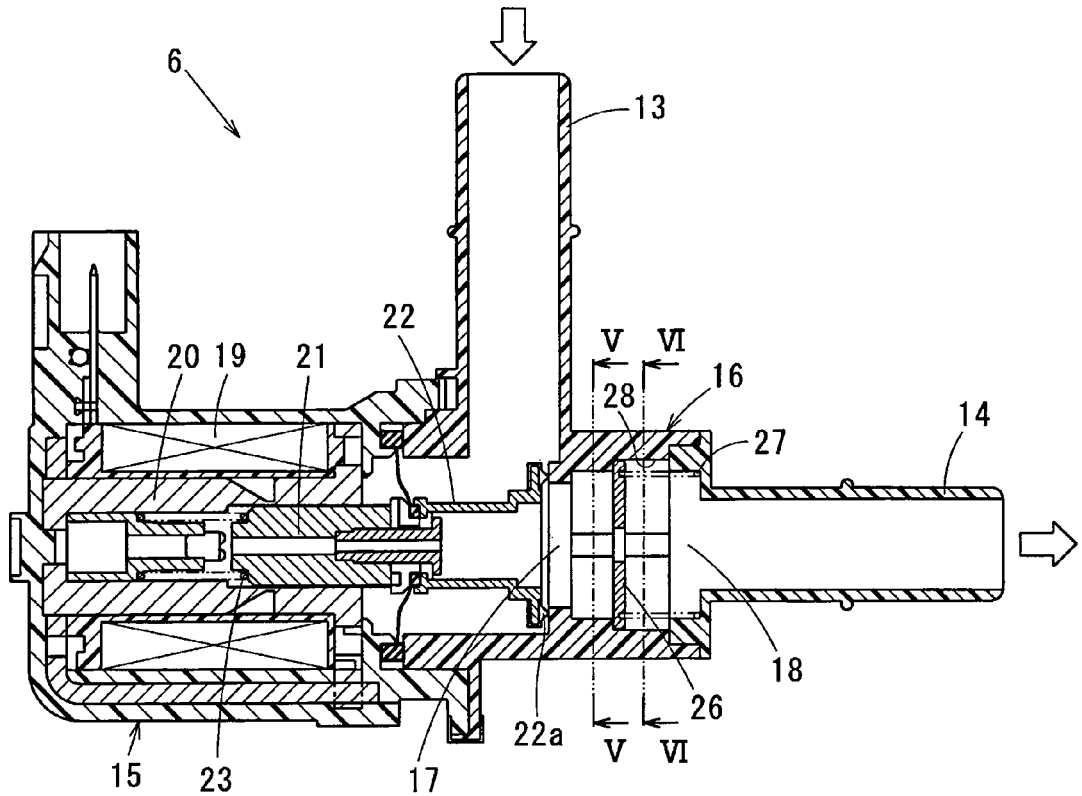
FIG. 4 is a sectional view showing a tank sealing valve.

Subsequently, a configuration of the tank sealing valve 6 will be described. As shown in FIG. 4, the tank sealing valve 6 includes an inlet pipe 13, an outlet pipe 14, a solenoid valve 15, a flow control valve 16, and/or the like. The inlet pipe 13 and the outlet pipe 14 are connected to the vapor passage 5. The solenoid valve 15 controls flow of in-tank gas, which contains fuel vapor. The flow control valve 16 switches flow of in-tank gas, which flows when the solenoid valve 15 opens. The inlet pipe 13 is connected to an upstream of the vapor passage 5. The inlet pipe 13 is configured to communicate with the fuel tank 1. The inlet pipe 13 has a downstream end at which an inlet port 17 opens. The inlet port 17 therethrough flows in-tank gas, which flows into the flow control valve 16. The outlet pipe 14 is connected to a downstream of the vapor passage 5. The outlet pipe 14 is configured to communicate with the canister 2. The outlet pipe 14 has an upstream end at which an outlet port 18 opens. The outlet port 18 therethrough flows in-tank gas, which flows from the flow control valve 16.

The solenoid valve 15 includes a coil 19, a stator 20, a movable body 21, a valve element 22, and/or the like. The coil 19 forms an electromagnet on supply of electricity. The stator 20 is magnetized with the electromagnet formed with the coil 19. The movable body 21 is drawn by the stator 20 when magnetized to move along the inner circumferential periphery of the coil 19 in the axial direction. The valve element 22 is movable with the movable body 21 integrally to open and close the inlet port 17. An ECU (engine control unit, not shown) implements an ON-and-OFF operation of the solenoid valve 15. Specifically, when the ECU sends an ON signal to magnetize the coil 19, the stator 20, which is magnetized, and the movable body 21 generate an attraction force therebetween. Thus, the attraction force causes the movable body 21 to move leftward in FIG. 4 along an opening direction. When the ECU sends an OFF signal to terminate supply of electricity to the coil 19, the attraction force ceases. Consequently, counterforce of a return spring 23 causes the movable body 21 to move back rightward in FIG. 4 along a closing direction.

The valve element 22 has a tip end opposed to the inlet port 17. The tip end of the valve element 22 is equipped with a seal member 22a, which is formed of rubber and is in an annular shape. The inlet port 17 has a circumference defining a valve seat surface. The seal member 22a opens when moving away from the valve seat surface. The seal member 22a closes when being seated onto and makes tightly contact with the valve seat surface. Specifically, the valve element 22 moves with the movable body 21 in the opening direction, thereby to cause the seal member 22a to move away from the valve seat surface. In this way, the valve element 22 opens the inlet port 17. The valve element 22 moves with the movable body 21 in the closing direction, thereby to cause the seal member 22a to make contact tightly with the valve seat surface. In this way, the valve element 22 closes the inlet port 17. The solenoid valve 15 has a normally-close configuration. Specifically, when the coil 19 is magnetized to draw the movable body 21, the solenoid valve 15 is activated. Thus, the valve element 22 opens the inlet port 17. When supply of electricity to the coil 19 is terminated to pushback the movable body 21, the solenoid valve 15 is de-activated. Thus, the valve element 22 closes the inlet port 17.

Figure 6:
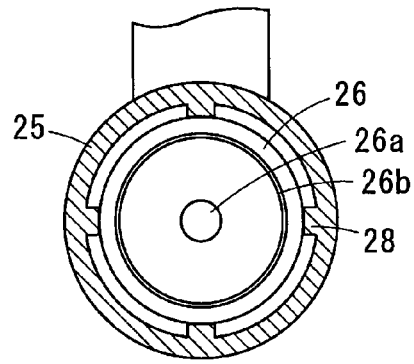
FIG. 6 is a sectional view showing the flow control valve taken along a line VI-VI in FIG. 4.

As shown in FIG. 1A, the flow control valve 16 includes a valve housing 25, a valve element 26, a spring 27, and/or the like. The valve housing 25 has an interior forming a valve chamber 24. The valve element 26 is provided inside the valve chamber 24. The spring 27 biases the valve element 26 toward the inlet port 17. The valve housing 25 is located between the inlet pipe 13 and the outlet pipe 14. The valve housing 25 has the inlet port 17 and the outlet port 18. The inlet port 17 and the outlet port 18 are opposed to each other along the axial center direction of the valve chamber 24. That is, the inlet port 17 and the outlet port 18 are opposed to each other along the horizontal direction in the drawing. As shown in FIG. 6, the valve element 26 is in a disk shape having a communication hole 26a. The communication hole 26a is in a circular shape and is located in a center portion of the valve element 26 in the radial direction. The communication hole 26a opens to communicate the inlet port 17 with the outlet port 18 therethrough. The valve element 26 is held by guide portions 28 at an outer circumferential periphery. The guide portions 28 are equipped on an inner circumferential periphery of the valve chamber 24. The valve element 26 is movable back and forth in the valve chamber 24.

Figure 5:
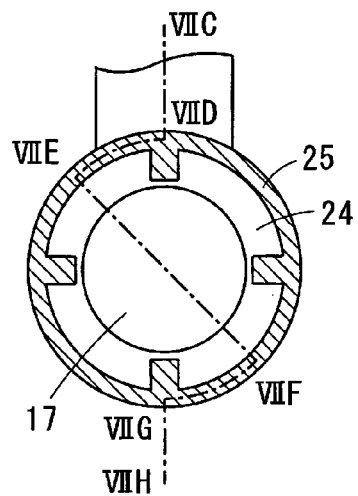
FIG. 5 is a sectional view showing the flow control valve taken along a line V-V in FIG. 4.

As shown in FIG. 6, each of the guide portions 28 is in a rib shape and are projected inward in the diametrical direction of the valve chamber 24. The guide portions 28 are located at multiple locations at regular intervals in the circumferential direction of the valve chamber 24. In the example of FIG. 6, four guide portions 28 are located at four locations. Each of the guide portions 28 has a step at a location on the side of the inlet port 17 relative to the center of the valve chamber 24 in the axial center direction. More specifically, as shown in FIGS. 5 and 6, the projection length of each of the guide portions 28, which is projected inward in the diametrical direction of the valve chamber 24, changes at the step. More specifically, the projection length on the side of the inlet port 17 relative to the step is greater than the projection length on the side of the outlet port 18. It is noted that, the inner diameter defined by the guide portions 28 on the side of the inlet port 17 relative to the step is smaller than the outer diameter of the valve element 26. The inner diameter defined by the guide portions 28 on the side of the outlet port 18 relative to the step is slightly greater than the outer diameter of the valve element 26. Therefore, the guide portions 28 function to guide movement of the valve element 26 selectively (only) on the side of the outlet port 18 relative to the step.

Figure 7:
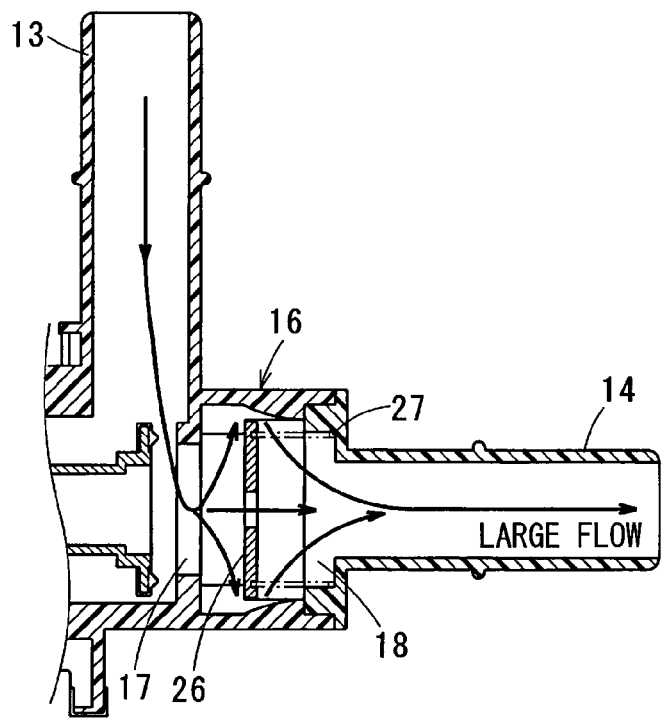
FIG. 7 is a sectional view showing the valve element at the OFF position, taken along a line VIIC-VIID-VIIE-VIIF-VIIG-VIIH in FIG. 5.
Figure 8:
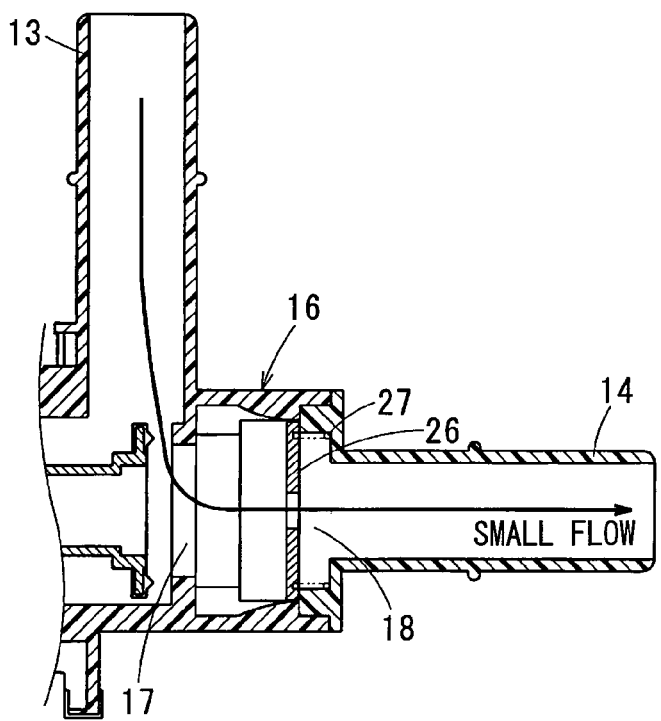
FIG. 8 is a sectional view showing the valve element at the ON position, taken along the line VIIC-VIID-VIIE-VIIF-VIIG-VIIH in FIG. 5.

As shown in FIG. 4, the spring 27 is supported at one end by a step formed on the inner circumferential periphery of the outlet pipe 14. The spring 27 is fitted to an annular groove 26b (FIG. 6) at the other end. The annular groove 26b is dented from the surface of the valve element 26. As shown in FIG. 4, the spring 27 biases the valve element 26 onto the steps formed on the guide portions 28. That is, the steps of the guide portions 28 form seated surfaces, which are located on the side of the inlet. The valve element 26 is biased from the spring 27 and is seated on the seated surfaces. The outlet pipe 14 has an end surface in which the outlet port 18 opens. The end surface of the outlet pipe 14 forms a seated surface on the side of the outlet. Therefore, the valve element 26 is movable back and forth in the interior of the valve chamber 24 between the seated surface on the side of the inlet and the seated surface on the side of the outlet. As shown in FIG. 7, when the valve element 26 is seated on the seated surface on the side of the inlet, the valve element 26 is at an OFF position. As shown in FIG. 8, when the valve element 26 is seated on the seated surface on the side of the outlet, the valve element 26 is at an ON position.

Subsequently, a fluid passage according to the present disclosure will be described. As shown in FIG. 1A, the tank sealing valve 6 according to the first embodiment forms an inner passage shown by an arrow A and an outer passage shown by an arrow B. The inner passage and the outer passage may function as a fluid passage according to the present disclosure. The inner passage enables in-tank gas to flow through the communication hole 26a of the valve element 26.

The outer passage enables in-tank gas to flow around the outer circumferential periphery of the valve element 26. In FIG. 6, the outer passage is formed between the guide portions 28, which are adjacent to each other in the circumferential direction of the valve chamber 24. The outer passage is formed between the inner circumferential periphery of the valve chamber 24 and the outer circumferential periphery of the valve element 26. In FIG. 1A, the inner circumferential periphery of the valve chamber 24 is shaped to throttle, such that the inner diameter of the valve chamber 24 decreases gradually from the upstream end toward the downstream end. With the present configuration, the passage area of the outer passage decreases nonlinearly. The passage area of the outer passage represents an opening area of the outer passage, which is perpendicular to the axial center direction of the valve chamber 24. That is, the passage area of the outer passage represents an opening area of a clearance formed between the inner circumferential periphery of the valve chamber 24 and the outer circumferential periphery of the valve element 26.

Figure 2A:
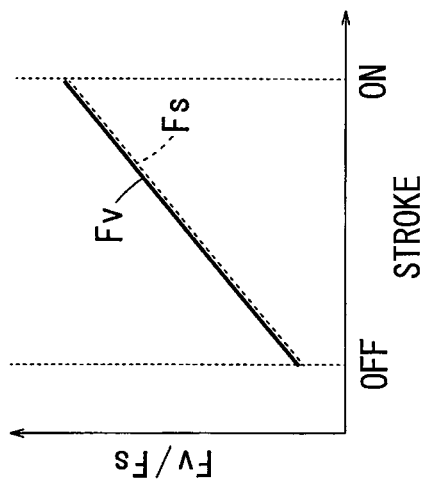
FIG. 2A is a graph showing a minimum passage area relative to a stroke of the flow control valve.
Figure 2B:
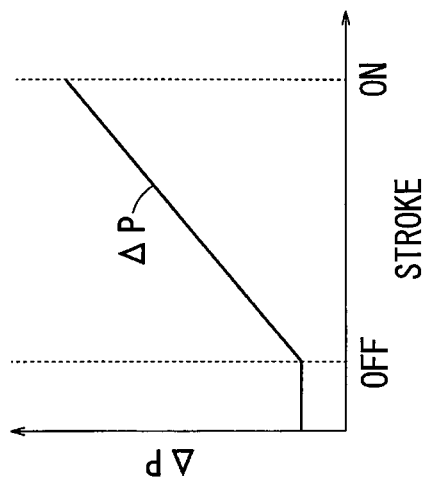
FIG. 2B is a graph showing a relation between the stroke of the flow control valve and a front-rear differential pressure of the flow control valve.
Figure 2C:
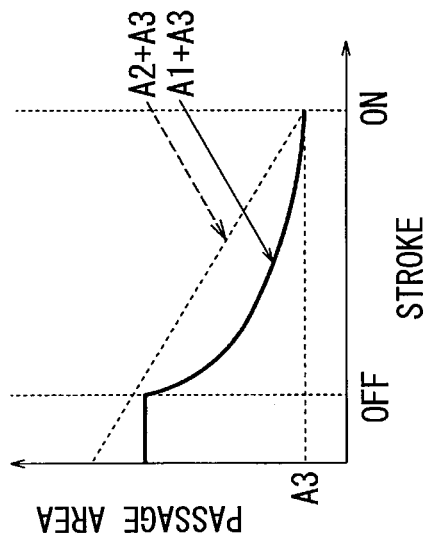
FIG. 2C is a graph showing a relation between the stroke of the flow control valve and a pressure-receiving force and a relation between the stroke of the flow control valve and a spring force.

As shown in FIG. 1B, the outer passage has the passage area A1, and the communication hole 26a has the opening area A3. The opening area A3 corresponds to the passage area of the inner passage. The opening area A3 is constant, and therefore, as shown in FIG. 2A, a minimum passage area changes nonlinearly (in a non-linear form) relative to the stroke of the valve element 26. In FIG. 1, a two-point chain line shows a lateral passage, which is in a tubular shape and is formed between the valve element 26 and the outlet port 18. The lateral passage has a lateral area A2 shown in FIG. 2A. In FIG. 1A, as shown by an arrow C, in-tank gas passes through the outer passage. Specifically, in-tank gas passes through the outer passage to pass through the lateral passage on the downstream side of the valve element 26. Thus, the in-tank gas flows out of the outlet port 18. It is noted that, when the valve element 26 moves to the ON position, the lateral area A2 becomes 0. Therefore, in-tank gas does not flow from the outer passage through the lateral passage to the downstream of the valve element 26. In addition, according to the first embodiment, the passage area A1 does not become greater than the lateral area A2, irrespective of the stroke (position) of the valve element 26. Therefore, as shown in FIG. 2A, the minimum passage area of the fluid passage is determined by the passage area A1 and the opening area A3. When the valve element 26 is at the OFF position, the minimum passage area is A1+A3. When the valve element 26 is at the ON position, the minimum passage area is A3. In FIGS. 2A, 2B, and 2C, the OFF denoted on the horizontal axis represents the OFF position of the valve element 26, and the ON denoted on the horizontal axis represents the ON position of the valve element 26.

When in-tank gas flows through the inner passage and the outer passage into the downstream of the valve element 26, the in-tank gas causes drop in pressure to cause differential pressure (front-rear differential pressure) between the upstream of the valve element 26 and the downstream of the valve element 26. On assumption that inlet pressure P is constant, and since flow Q is constant, the front-rear differential pressure of the valve element 26 is in a correlation with $1/A^2$ in the following Bernoulli equation (1), wherein the minimum flow area A. In the first embodiment, the inlet pressure P is in-tank pressure.

$$\tfrac{1}{2}(Q/A)^2 + P/\rho = \text{const} \tag{1}$$

ρ: density of fluid

Therefore, as shown in FIG. 2B, the minimum flow area A is changed nonlinearity relative to the stroke of the valve element 26, thereby to correct the front-rear differential pressure ΔP of the valve element 26 in a linear form. In other words, the minimum flow area A is changed in a non-linear form, such that the front-rear differential pressure ΔP changes linearly (in a linear form) relative to the stroke of the valve element 26.

A pressure-receiving force Fv, by which the valve element 26 is biased toward the outlet port 18, is calculated by multiplication of the front-rear differential pressure ΔP of the valve element 26 and a pressure-receiving area of the valve element 26. It is note that, the pressure-receiving area of the valve element 26 is constant. Therefore, the pressure-receiving force Fv is in proportion to the front-rear differential pressure ΔP of (across) the valve element 26. Therefore, as shown in FIG. 2C, the front-rear differential pressure ΔP relative to the stroke of the valve element 26 is increased in a linear form, thereby to enable to correct the pressure-receiving force Fv, which works on the valve element 26, in a linear form, similarly to the spring force Fs. The valve element 26 moves to a position where the pressure-receiving force Fv balances with the spring force Fs. Therefore, when a relation of pressure-receiving force Fv>spring force Fs is satisfied, the valve element 26 moves from the inlet side toward the outlet side. Alternatively, when a relation of pressure-receiving force Fv<spring force Fs is satisfied, the valve element 26 moves from the outlet side toward the inlet side.

The inlet pressure (in-tank pressure) is applied to the inlet port 17. The pressure-receiving force Fv is applied to the valve element 26. When the relation that pressure-receiving force Fv>spring force Fs is satisfied, the inlet pressure is P2. When the relation that pressure-receiving force Fv<spring force Fs is satisfied, the inlet pressure is P1. In the first embodiment, P1=P2. That is, in a case where the inlet pressure, when the solenoid valve 15 opens, is greater than P2 (=P1), the valve element 26 moves toward the outlet. Subsequently, when the inlet pressure decreases to be less than P1, the valve element 26 returns toward the inlet. The values of the inlet pressure P1 and P2 are set between the maximum pressure Pmax and the minimum pressure Pmin shown in FIG. 3. In order to avoid leakage of fuel vapor to the atmosphere, a flow quantity of fuel vapor needs to be switched from a large flow quantity to a small flow quantity. When the flow quantity of fuel vapor is switched from the large flow quantity to the small flow quantity, the pressure is at Pmax. When the pressure is at Pmax, the flow quantity may be at a maximum flow quantity. In consideration of waiting time for de-pressurization when refueling the vehicle, a flow quantity of fuel vapor is switched from a small flow quantity to a large flow quantity. When the flow quantity of fuel vapor is switched from the small flow quantity to the large flow quantity, a lower limit of the pressure is Pmin.

Subsequently, an operation of the tank sealing valve 6 will be described. In the tank sealing valve 6, the solenoid valve 15 is in a closed state, excluding a part of a traveling condition of the vehicle or excluding when the vehicle is re-fueled. That is, the solenoid valve 15 has a normally-close configuration and closes the inlet port 17. When re-fueling of the vehicle is detected, the tank sealing valve 6 is maintained in an opened state until the re-fueling of the vehicle is completed. Specifically, the ECU controls the solenoid valve 15 at the opened state to cause the valve element 22 to open the inlet port 17. When the solenoid valve 15 opens, in-tank gas including fuel vapor flows into the inlet port 17. In this way, the pressure-receiving force Fv and the spring force Fs are applied to the valve element 26. Subsequently, when the relation that pressure-receiving force Fv>spring force Fs is satisfied, as shown in FIG. 8, the valve element 26 moves toward the outlet to be at the ON position. Thus, the flow quantity changes to a small flow quantity. Subsequently, the in-tank pressure decreases. When the relation that pressure-receiving force Fv<spring force Fs is satisfied, as shown in FIG. 7, the valve element 26 returns toward the inlet to be at the OFF position. Thus, the flow quantity changes to a large flow quantity.

(Operation and Effect of First Embodiment)

Figure 3:
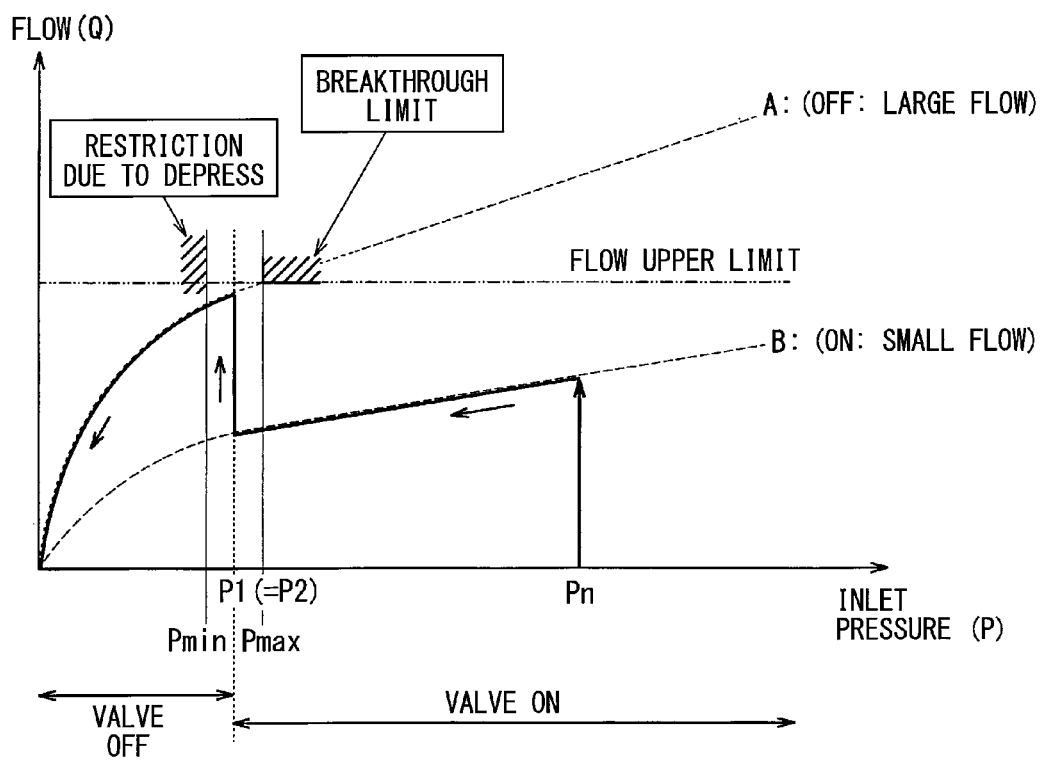
FIG. 3 is a graph showing a P-Q characteristic when the flow control vale is at an OFF position and a P-Q characteristic when the flow control vale is at an ON position, according to a first embodiment.

In the tank sealing valve 6, the minimum flow area of the fluid passage is changed in a non-linear form, such that the front-rear differential pressure ΔP changes in a linear form relative to the stroke of the valve element 26. Therefore, as shown in FIG. 2C, the present configuration enables to correct the pressure-receiving force Fv applied to the valve element 26 into a linear form, similarly to the spring force Fs. Consequently, as shown in FIG. 3, the present configuration enables to cause the inlet pressure P2, when the relation that pressure-receiving force Fv>spring force Fs is satisfied, to coincide with the inlet pressure P1, when the relation that pressure-receiving force Fv<spring force Fs is satisfied. It is noted that, in FIG. 3, the graph A represents a P-Q characteristic, when the valve element 26 is at the OFF position, and the graph B represents a P-Q characteristic, when the valve element 26 is at the ON position.

With the present configuration, when the tank sealing valve 6 opens, i.e., when the solenoid valve 15 opens at, for example, a pressure Pn greater than the pressure P2, the valve element 26 moves toward the outlet to change the flow quantity to a small flow quantity. Therefore, fuel vapor can be restricted from blowing through the canister 2, without exceeding a breakthrough limit of the canister 2. Subsequently, when the in-tank pressure decreases to P1, the valve element 26 returns toward the inlet to change the flow quantity to a large flow quantity. Therefore, the present configuration enables to significantly reduce the time required to de-pressurize the tank. As described above, in the tank sealing valve 6 according to the first embodiment, the pressure P1=P2 is set between the pressure Pmin and the pressure Pmax. In this way, the present configuration enables to avoid breakthrough of the canister 2 and to reduce the waiting time for de-pressurization, simultaneously.

(Modification)

According to the first embodiment, the inlet pressure P2, at which the valve element 26 is activated to move from the inlet toward the outlet, is caused to coincide with the inlet pressure P1, at which the valve element 26 returns from the outlet toward the inlet. It is noted that, the relation that P1=P2 is not necessarily satisfied. The pressures P1 and P2 may be set between the pressure Pmin and the pressure Pmax.

In the tank sealing valve 6 of the first embodiment, the solenoid valve 15 is located closer to the inlet port 17 than the flow control valve 16. It is noted that, the solenoid valve 15 may be located on the side of the outlet port 18. That is, the first embodiment employs the configuration to cause the solenoid valve 15 to open and close the inlet port 17. It is noted that, a configuration to cause the solenoid valve 15 to open and close the outlet port 18 may be employable.

The tank sealing valve 6 described in the first embodiment includes the solenoid valve 15, which opens and closes the inlet port 17, and the flow control valve 16, which control the flow. It is noted that, only the flow control valve 16 without the solenoid valve 15 may be employable separately from the tank sealing valve 6. Moreover, in the flow control valve 16, the communication hole 26a of the valve element 26 may be omitted.

Furthermore, in the first embodiment, the flow control valve 16 of the present disclosure is employed in the tank sealing valve 6, which is employed in the vapor fuel processing apparatus of the vehicle. The present disclosure is not limited to the first embodiment. The present disclosure is employable in various configurations to control a flow according to fluid pressure.

The flow control valve according to the present disclosure includes the valve housing, the valve element, and the spring. The valve housing defines the valve chamber internally and having the inlet port and the outlet port. The inlet port and the outlet port are opposed to each other in the axial center direction of the valve chamber and opened to the valve chamber. The valve element is equipped in the valve chamber and movable between the OFF position, which is on the side of the inlet port, and the ON position, which is on the side of the outlet port. The spring is configured to bias the valve element (26) toward the OFF position. The valve element is configured, on receiving pressure of fluid, which flows into the inlet port, to move from the OFF position to the ON position to switch a flow quantity of fluid, which flows through the valve chamber, from the large flow quantity to the small flow quantity. The valve element is further configured, on decrease in pressure of fluid, which flows into the inlet port, to return from the ON position to the OFF position to switch the flow quantity from the small flow quantity to the large flow quantity. The valve chamber has the throttle shape to decrease in the inner diameter gradually from the upstream end of the outer passage toward the downstream end of the outer passage, to decrease t minimum passage area of the fluid passage in the non-linear form, and to increase the front-rear differential pressure of the valve element in the linear form relative to the stroke of the valve element when the valve element moves from the OFF position toward the ON position.

The flow control valve according to the present disclosure has the throttle shape, in which the inner diameter of the valve chamber decreases gradually from the upstream end of the outer passage toward the downstream end of the outer passage. According to the present configuration, the minimum passage area of the fluid passage decreases in a non-linear with the stroke of the valve element, when the valve element moves from the OFF position to the ON position on application of pressure of fluid, which flows into the inlet port. In other words, the minimum passage area of the fluid passage is changed to reduce in a non-linear form, such that the front-rear differential pressure across the valve element increases in a linear form, as the valve element moves from the OFF position toward the ON position. The present configuration enables to correct the pressure-receiving force, which is in proportion to the front-rear differential pressure of the valve element, to be substantially in a linear form similarly to the spring force. The pressure-receiving force is a multiplication of the pressure-receiving area of the front-rear differential pressure by the valve element of the valve element. Consequently, the present configuration enables to coincide the inlet pressure, when the valve element moves from the inlet toward the outlet, with the inlet pressure, when the valve element moves from the outlet toward the inlet. Therefore, the present configuration enables to reduce the difference between the pressure when the valve element is activated and the pressure when the valve element is returned. Therefore, the present configuration enables to switch between the large flow quantity and the small flow quantity substantially at the same pressure.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A flow control valve comprising:
a valve housing defining a valve chamber internally and having an inlet port and an outlet port, the inlet port and the outlet port being opposed to each other in an axial center direction of the valve chamber and opened to the valve chamber;
a valve element equipped in the valve chamber and movable between an OFF position, which is on a side of the inlet port, and an ON position, which is on a side of the outlet port; and
a spring configured to bias the valve element toward the OFF position, wherein
the valve element is configured, on receiving pressure of fluid flowing into the inlet port, to move from the OFF position to the ON position to switch a flow quantity of fluid, which flows through the valve chamber, from a large flow quantity to a small flow quantity,
the valve element is further configured, on decrease in pressure of fluid flowing in the inlet port, to return from the ON position to the OFF position to switch the flow quantity from the small flow quantity to the large flow quantity,
the valve chamber has a fluid passage including an outer passage to flow fluid therethrough, the outer passage being defined between an inner periphery of the valve chamber and an outer periphery of the valve element,
the valve chamber has a throttle shape
to decrease in an inner diameter gradually from an upstream end of the outer passage toward a downstream end of the outer passage
to decrease a minimum passage area of the fluid passage in a non-linear form and
to increase a front-rear differential pressure of the valve element in a linear form relative to a stroke of the valve element when the valve element moves from the OFF position toward the ON position.

2. The flow control valve according to claim 1, wherein
the valve housing has a plurality of guide portions on the inner periphery of the valve chamber,
the guide portions are configured to guide movement of the valve element,
the outer passage is formed between the guide portions, which are adjacent to each other in a circumferential direction of the valve chamber, and
the outer passage is formed between the inner periphery of the valve chamber and the outer periphery of the valve element.

3. The flow control valve according to claim 1, wherein
the fluid passage includes a communication hole, which opens in a center portion of the valve element,
when the valve element is at the OFF position, the minimum passage area is a sum of an opening area of the outer passage and an opening area of the communication hole, and when the valve element is at the ON position, the minimum passage area is the opening area of the communication hole.

4. A vapor fuel processing apparatus configured to cause an adsorbent in a canister to absorb fuel vapor, which occurs in a fuel tank of a vehicle, and to cause the adsorbent to emit fuel vapor into an intake passage of an internal combustion engine when the internal combustion engine is in operation, the vapor fuel processing apparatus comprising:
    a tank sealing valve equipped in a path, which is for communicating the fuel tank with the canister, wherein
    the tank sealing valve is configured to seal the fuel tank, and
    the tank sealing valve includes the flow control valve according to claim 1.

* * * * *